(12) United States Patent
Wolf

(10) Patent No.: US 8,794,363 B2
(45) Date of Patent: Aug. 5, 2014

(54) MOTOR VEHICLE WITH A DEVICE FOR SUPPLYING COOLING AIR

(71) Applicant: Dr. Ing. h.c. F. Porsche Aktiengesellschaft, Stuttgart (DE)

(72) Inventor: Thomas Wolf, Riedstadt (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/795,344

(22) Filed: Mar. 12, 2013

(65) Prior Publication Data

US 2013/0248265 A1 Sep. 26, 2013

(30) Foreign Application Priority Data

Mar. 22, 2012 (DE) .......................... 10 2012 102 445

(51) Int. Cl.
*B60K 11/00* (2006.01)
(52) U.S. Cl.
USPC ........................................ 180/68.1; 180/68.6
(58) Field of Classification Search
USPC ............................... 180/68.1, 68.2, 68.3, 68.6
See application file for complete search history.

(56) References Cited

U.S. PATENT DOCUMENTS

| | | | | |
|---|---|---|---|---|
| 4,457,558 | A * | 7/1984 | Ishikawa | 180/68.6 |
| 4,706,615 | A * | 11/1987 | Scadding | 123/41.01 |
| 5,322,340 | A * | 6/1994 | Sato et al. | 180/68.1 |
| 5,901,786 | A | 5/1999 | Patel et al. | |
| 7,040,690 | B2 * | 5/2006 | Soja et al. | 296/180.5 |
| 7,380,869 | B2 * | 6/2008 | Nakaya | 296/180.1 |
| 7,886,859 | B2 | 2/2011 | Caldirola | |
| 8,091,516 | B2 | 1/2012 | Preiss | |
| 8,091,668 | B2 * | 1/2012 | Amano et al. | 180/68.1 |
| 8,292,014 | B2 * | 10/2012 | Sugiyama | 180/68.1 |
| 8,297,685 | B2 * | 10/2012 | Wolf et al. | 296/180.3 |
| 8,517,130 | B2 * | 8/2013 | Sakai | 180/68.1 |

FOREIGN PATENT DOCUMENTS

| | | |
|---|---|---|
| DE | 31 50 152 | 6/1983 |
| DE | 42 29 945 | 3/1994 |
| DE | 10 2007 022 298 | 11/2008 |
| DE | 10 2007 024 746 | 11/2008 |
| DE | 10 2008 020 399 | 10/2009 |
| DE | 10 2009 050 967 | 5/2011 |
| DE | 10 2010 017 636 | 12/2011 |
| DE | 10 2010 046 147 | 3/2012 |
| DE | 10 2011 011 250 | 8/2012 |
| EP | 0 312 936 | 4/1989 |
| EP | 1 907 267 | 9/2009 |

OTHER PUBLICATIONS

German Search Report of Oct. 29, 2012.

* cited by examiner

*Primary Examiner* — Hau Phan
(74) *Attorney, Agent, or Firm* — Gerald E. Hespos; Michael J. Porco; Matthew T. Hespos

(57) ABSTRACT

A motor vehicle has at least one adjustable air-guiding device on the underbody. The air-guiding device has a cross-sectionally U-shaped duct and is adjustable between a closed position and an open position. The motor vehicle also has a radiator device with a radiator and a radiator shutter with adjustable flaps for controlling the air flow through the radiator. A control device actuates the air-guiding device depending on the position of the radiator shutter so that, irrespective of the position of the flaps of the radiator shutter, an at least approximately identical pitching moment is obtained at the motor vehicle and at the same time the aerodynamic drag is reduced.

7 Claims, 2 Drawing Sheets

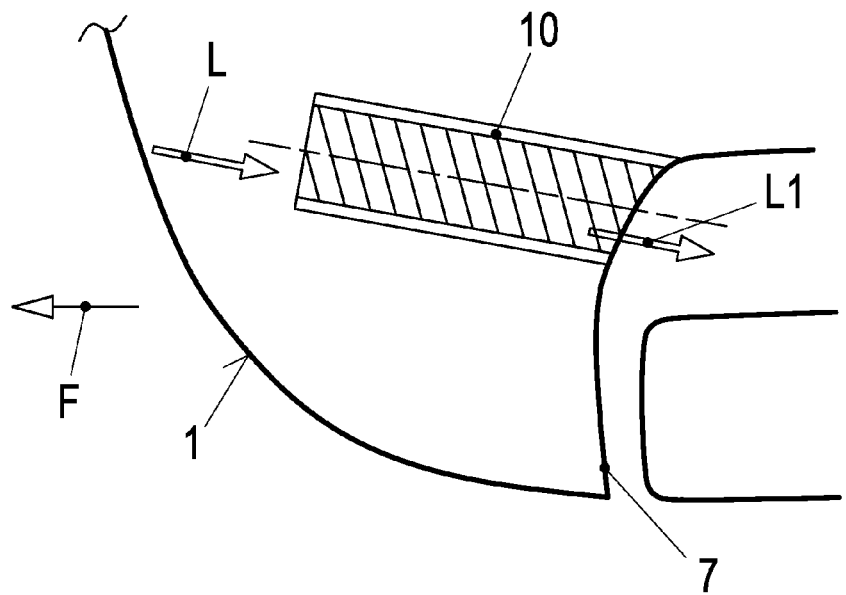
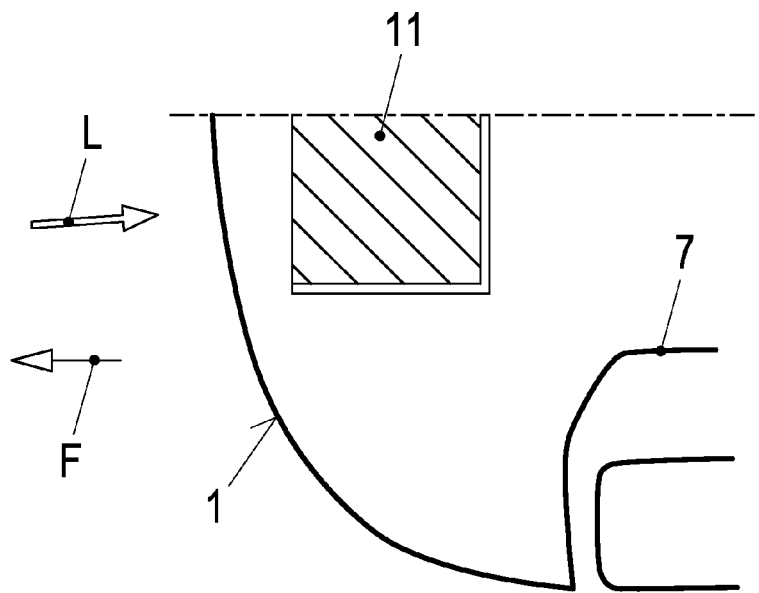

MOTOR VEHICLE WITH A DEVICE FOR SUPPLYING COOLING AIR

CROSS REFERENCE TO RELATED APPLICATIONS

This application claims priority under 35 USC 119 to German Patent Appl. No. 10 2012 102 445.6 filed on Mar. 22, 2012, the entire disclosure of which is incorporated herein by reference.

BACKGROUND

1. Field of the Invention

The invention relates to a motor vehicle with a device for supplying cooling air.

2. Description of the Related Art

DE 10 2009 050 967 A1 discloses a closable air-conducting cooling system for a motor vehicle brake. The air-conducting cooling system is arranged on a front wheel guard and has at least one braking air duct in the bodywork at the front wheel guard. A closure device is arranged at the braking air duct and is movable between positions for opening or closing the braking air duct. The closure device has a housing arranged on an underbody at an end of the braking air duct that faces the front wheel guard and an extendable spoiler element is arranged in the housing.

An object of the invention is to provide a device for supplying cooling air, with a cooling air controller and a driving controller for an air-guiding device that ensures an optimum supply of cooling air to the radiator unit and permits an optimum pitching moment at the vehicle and at the same time reduces an aerodynamic drag of the vehicle.

SUMMARY OF THE INVENTION

The invention influences the pitching moment and the aerodynamic drag of the vehicle by opening or closing cooling air flaps in a radiator shutter of a radiator according to requirements and provides a corresponding activation of an air-guiding device. The air-guiding device is arranged on the underbody between the radiator and a wheel guard of the vehicle and in proximity to a downwardly open U-shaped adjustable flow duct. The air-guiding device is adjustable between an open position and a closed position. In the open position, the air guiding device curves upward to define a downwardly convex air-guiding surface that opens the flow duct. In the closed position, the air guiding device forms an air-guiding surface that is level with the underbody and closes the flow duct. A control device is provided and adjusts the air-guiding device depending on the position of the cooling air flaps of the radiator shutter. The air-guiding device according to the invention comprises the level and convex air-guiding surface of the flow duct. A driving device adjusts the air-guiding surface and hence adjusts the flow duct.

The air-guiding device that is in the open position forms the upwardly curved, convex air-guiding surface that opens the downwardly U-shaped flow duct and can supply an upward air flow, for example, to cool the wheel brakes. The reaction force of the upward air flow reduces the front axle lift. The air-guiding device that is in the lowered closed position forms the level air-guiding surface and closes the flow duct. The front axle lift increases in this position and the aerodynamic drag is reduced, i.e. the front axle lift is higher and the aerodynamic drag is lower than in the open position with the convex air-guiding surface.

The air-guiding device preferably comprises one or more adjustable flow ducts on the underbody of the vehicle. The flow ducts may be designed as braking air ducts or as underbody diffusers.

The radiator shutter permits control of an air mass flow through the radiator of the motor vehicle according to requirements and is used primarily for reducing the aerodynamic drag and fuel consumption. A reduction in the aerodynamic drag and fuel consumption is obtained by closing cooling air flaps. However, the position of the radiator cover can cause a front wheel lift force and therefore a pitching moment of the motor vehicle, which may lead to an overall severe change in the lift balance and therefore in the driving performance. Accordingly, the invention provides a first position where the cooling air flaps of the radiator shutter are completely open, and the flow duct of the air-guiding device is open and forms the upwardly convexly curved air-guiding surface.

The invention also provides a second position where the cooling air flaps of the radiator shutter are closed completely, and the flow duct is closed and forms a level air-guiding surface with the underbody.

In a basic configuration of the motor vehicle, the cooling air flaps of the radiator shutter are completely open, and the adjustable air-guiding device is in an open active position.

In the second position, the cooling air flaps are closed and the air-guiding device also is closed and transferred into the level position, i.e. moved into what is referred to as the closed position. Accordingly, the reduction in the front axle lift, which is brought about by closing the cooling air flaps, is compensated for by the increase in the front axle lift produced by closing the flow duct. The aerodynamic drag is reduced further, since the advantage of the aerodynamic drag resulting from the closed radiator shutter and the reduction in the aerodynamic drag that is brought about when closing the flow duct add up in an aerodynamically advantageous manner. The reduction in the aerodynamic drag that is produced by the combination of the radiator shutter and the adjustable air-guiding device is therefore greater than the reduction brought about by the radiator shutter by itself.

The cooling air flaps of the radiator shutter may be adjusted to an intermediate position between the open and the closed positions, and the air-guiding device has a position between the open position with the convexly curved air-guiding surface and the closed position with the level air-guiding surface.

The cooling air flaps of the radiator shutter may be closed in an active position, and the air-guiding device may form an open position with the upwardly convexly curved air-guiding surface. This embodiment is used, for example, for racing track use, in which an advantageous position in terms of driving dynamics with low lift of the vehicle is intended to be obtained.

The combination of closed cooling air flaps and the open air-guiding device with the convex air-guiding surface therefore is of advantage because the reduction in lift that arises when the radiator shutter is closed, and the reduction in lift that results with the open flow duct with the convex air-guiding surface, can add up in an advantageous manner in terms of driving dynamics.

An exemplary embodiment of the invention is illustrated in the drawings and is described in more detail below.

BRIEF DESCRIPTION OF THE DRAWINGS

FIG. 3 is a bottom view showing downwardly open U-shaped air flow duct.

FIG. 4 is a bottom view of an adjustable air-guiding device with an underbody diffuser.

DETAILED DESCRIPTION OF THE PREFERRED EMBODIMENTS

Figure 1:
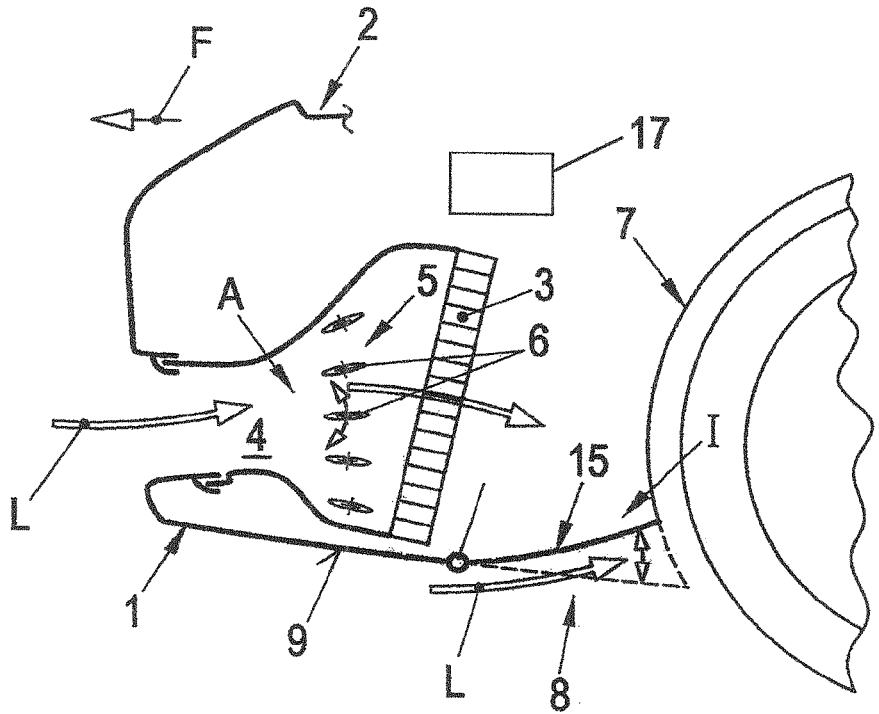
FIG. 1 shows a section along the line A-A through a vehicle with a radiator on the front side and an open radiator shutter arranged in front thereof and with an adjustable air-guiding device in an open active position.

A cooling air controller and a driving controller in accordance with an embodiment of the invention are provided at a front end 1 of a vehicle 2 for supplying cooling air L to a radiator 3 via an air inlet duct 4. The cooling air controller and driving controller has a radiator shutter 5 with adjustable cooling air flaps 6 in front of the radiator. The vehicle 2 has a wheel house 7 downstream of the radiator 3 and an adjustable air-guiding device 8 is arranged between the radiator 3 and the wheel house 7 of the vehicle 2 on the lower side of the air inlet duct 4.

The air-guiding device 8 is arranged on the underbody 9 of the vehicle 2 and below a U-shaped, downwardly open flow duct 10 (FIG. 3) or an adjustable underbody diffuser 11 (FIG. 4) that can be positioned at an angle and is adjustable parallel to the underbody 9.

Figure 2:
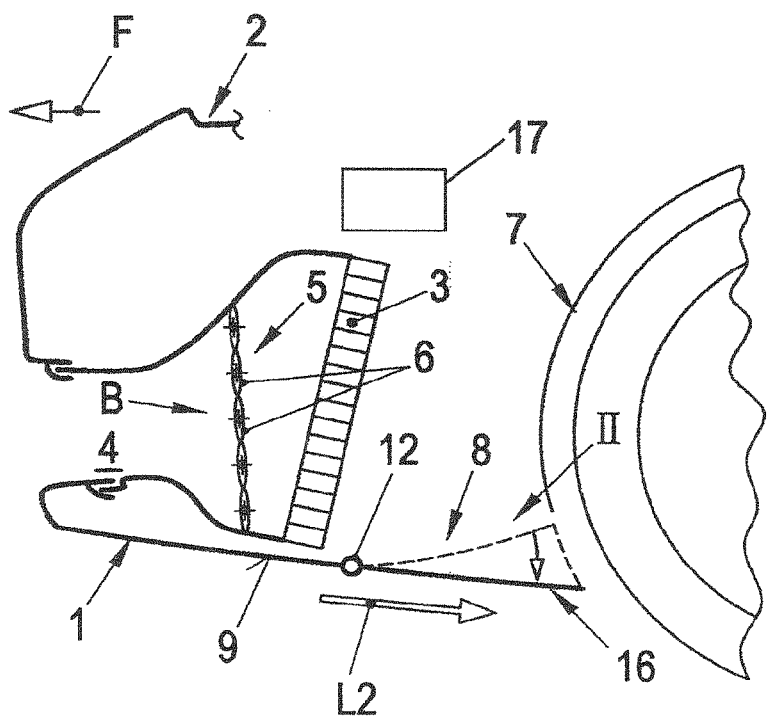
FIG. 2 shows a section according to FIG. 1 with closed radiator shutter and the air-guiding device in a closed active position of the air-guiding device.

The air-guiding device 8 is adjustable about an axis 12 or another adjustable air-guiding element is mounted in the flow duct 10 for movement between a first or open position I, as shown in FIG. 1 and a second or closed position II, as shown in FIG. 2. The air-guiding device 8 that is moved into the open position I curves up into the flow duct 10 to define a downward convex air-guiding surface 15, as shown in FIG. 1. However, the air guiding device 8 that is moved to the closed position II closes the flow duct 10 and has a level air-guiding surface 16 substantially aligned with the underbody 9, as shown in FIG. 2. The air-guiding device 8 is moved between the positions I and II via a control device 17 depending on the position of the cooling air flaps 6 of the radiator shutter 5. The flow duct 10 of the air-guiding device 8 is adjusted via a driving control device 17.

In the open position I, the flow duct 10 of the air-guiding device 8 brings about a direct supply of air to the wheel brake of the vehicle 2 and therefore forms what is referred to as a braking air duct.

The flow duct 10 of the air-guiding device 8 is adjustable about the axis 12 via the driving control device, which interacts with the control device of the radiator shutter 5 to coordinate between the adjustment of the cooling air flaps 6 and the air-guiding device 8. A plurality of flow ducts 10 may be arranged on the underbody 9 and a flow duct 10 opening into the wheel guard 7 preferably is arranged on each wheel side.

The cooling air flaps 6 of the radiator shutter 5 are completely open in a first active position A of the radiator 3, and the air-guiding device 8 has an open position with a convexly curved air-guiding surface 15 being formed so that an air flow L1 is guided obliquely up into the wheel guard 7 and to the brake, as illustrated in FIG. 1.

The cooling air flaps 6 of the radiator shutter 5 are completely closed in a second active position B of the radiator 3, and the flow duct 10 of the air-guiding device 8 forms a level air-guiding surface 16 aligned with the underbody 9 so that the air L2 flows to the underbody 9, as illustrated in FIG. 2.

The cooling air flaps 6 of the radiator shutter 5 can be held in an intermediate position between the open position A and the closed position B, wherein the air-guiding device 8 takes up a position between the position in the closed and open positions II and I.

Still further, the cooling air flaps 6 of the radiator shutter 5 can be closed and the air-guiding device 8 can be moved to the position with the upwardly convexly curved air-guiding surface 15 (FIG. 1).

In particular, the invention relates to a motor vehicle with at least one air-guiding device 8 on the underbody 9. A driving device is provided to adjust the air-guiding device between a closed position II, an open active position I and at least one further intermediate position. The motor vehicle also has a radiator device with a radiator 3 and a radiator shutter 5 with adjustable flaps 6 for controlling the air flow L through the radiator 3. A control device actuates the air-guiding device 8 depending on the position of the radiator shutter 5 so that an at least approximately identical pitching moments are obtained at the motor vehicle irrespective of the position of the flaps 6 of the radiator shutter 5 and aerodynamic drag is reduced.

What is claimed is:

1. A motor vehicle, comprising: a front end; a radiator arranged in the front end; an air inlet duct in the front end and extending to the radiator, a radiator shutter arranged in the air inlet duct, the radiator shutter having adjustable cooling air flaps that are movable between an open position that permits air flow to the radiator and increases front axle lift and a closed position that blocks air flow to the radiator and decreases front axle lift; a U-shaped, downwardly open, adjustable flow duct, at least part of the adjustable flow duct being between the radiator and a wheel guard of the vehicle for providing air flow to the wheel guard; an air-guiding device arranged on an underbody of the vehicle between the radiator and the wheel guard, the air-guiding device being movable between a first active position where the air-guiding device forms an upwardly curved, downwardly convex air-guiding surface that permits air flow from an underside of the vehicle, into the adjustable flow duct and to the wheel guard with reduced front axle lift and a second active position where the air-guiding device closes the adjustable flow duct and defines a level air-guiding surface substantially aligned with the underbody and with increased front axle lift; and a control device operative for adjusting the air-guiding device between the first active position and the second active position depending on a position of the cooling air flaps of the radiation shutter to avoid an excessive increase of front axle lift that would be caused by a simultaneous opening of the cooling air flaps and movement of the air guiding device to the second active position.

2. The motor vehicle of claim 1, wherein the air-guiding device is adjustable via a driving device.

3. The motor vehicle of claim 1, wherein the at least one flow duct comprises at least one braking air ducts and/or at least one underbody diffuser.

4. The motor vehicle of claim 1, wherein the control device is operative so that the air-guiding device opens the flow duct and forms the upwardly convexly curved air-guiding surface when the cooling air flaps of the radiator shutter are completely open.

5. The motor vehicle of claim 1, wherein the control device is operative so that the air-guiding device closes the flow duct and forms the air-guiding surface level with the underbody when the cooling air flaps of the radiator shutter are completely closed.

6. The motor vehicle of claim 1, wherein the cooling air flaps of the radiator shutter are adjustable to an intermediate position between the open position and the closed position, and wherein the air-guiding device has a position between the closed and the open position of the air-guiding surface.

7. The motor vehicle of claim 1, wherein the motor vehicle is a racing vehicle and wherein the control device permits the cooling air flaps of the radiator shutter to be closed in the active position of the radiator, and simultaneously permits the air-guiding device to be open in the active position and forms an upwardly convexly curved air-guiding surface for racing situations where low lift is advantageous.

* * * * *